United States Patent Office 3,417,150
Patented Dec. 17, 1968

3,417,150
POLYHALOPHENOLS
Herbert F. Bondy, Chesterfield, and James E. F. Williams, Hasland, Chesterfield, England, and Peter Geoffrey Kirk, Oakleigh, Victoria, Australia, assignors to Coalite and Chemical Products Limited, Bolsover, near Chesterfield, Derbyshire, England, a British company
No Drawing. Filed June 28, 1965, Ser. No. 467,695
12 Claims. (Cl. 260—623)

The invention relates to a process for the production of polyhalophenols, particularly trihalophenols.

It is known to produce trichlorophenol from tetrachlorobenzene by hydrolysis under pressure or by heating with a high boiling solvent in an alkaline medium.

It is an object of the invention to provide an improved process for the production of trihalophenols, particularly trichlorophenols.

According to the invention, a process for the production of a polyhalophenol, particularly a trihalophenol, comprises subjecting a polyhalobenzene containing at least three halogen atoms in the molecule, e.g., a tetrahalobenzene to alkaline hydrolysis at elevated temperature in an organic solvent, particularly an aliphatic diol such as diethylene glycol, in the presence of an additive which assists in the prevention of the sublimation or evaporation of the tetrahalobenzene.

The process according to the invention is particularly suitable for the production of 2,4,5-trichlorophenol from 1,2,4,5-tetrachlorobenzene. The hydrolysis of the tetrachlorobenzene is preferably effected with sodium hydroxide or other alkali metal hydroxide in glycol at a temperature in the range 160–185° C., for example at 170° C. The preferred compound employed to inhibit sublimation or evaporation of the tetrachlorobenzene is a dichlorobenzene, particularly ortho-dichlorobenzene. The presence of the ortho-dichlorobenzene further assists in ensuring substantially complete reaction of the initial tetrachlorobenzene in that it aids the removal of water formed during hydrolysis.

Upon completion of the reaction, the reaction mixture is cooled, for example, to a temperature in the range from normal atmospheric temperatures to 50° C., and is neutralised or acidified. The acid employed is preferably one which gives with the hydrolytic agent, for example sodium hydroxide, a salt which is insoluble in the solvent employed in the reaction, so facilitating recovery of the solvent. A preferred acid is sulphuric acid. The preferred solvent or reaction medium is ethylene glycol and when the hydrolytic agent is sodium hydroxide, acidification of the reaction mixture with dilute sulphuric acid results in the separation of sodium sulphate.

The acidified reaction mixture is then preferably diluted with sufficient water to permit the resultant aqueous mixture to separate into two layers, namely an organic layer containing the phenolic product and an aqueous glycol layer containing the inorganic salt. The layer containing the phenolic product is separated and fractionally distilled. The aqueous glycol layer is dehydrated, leaving the inorganic salt in suspension in the glycol. The salt may be readily separated from the glycol by centrifuging and the glycol so recovered may be recycled. If hydrochloric acid is used in place of sulphuric acid, the sodium or other alkali metal chloride formed is soluble to some extent in glycol and is consequently more difficult to separate from glycol than the sulphate.

The invention is illustrated in the following example in which the parts are by weight.

Example 1,420 parts of 1,2,4,5-tetrachlorobenzene were placed in a stainless steel reaction vessel which had a stirrer and a device to remove water from a reflux condenser. To the tetrachlorobenzene were added 3,000 parts of glycol, 600 parts of caustic soda and 200 parts of ortho-dichlorobenzene.

The mixture was stirred and heated to 180° C. and maintained at that temperature for four hours. During the warming-up period and before the temperature reached 180° C., water which had formed during the reaction was constantly removed from the mixture. The amount of water removed was 300 parts.

Upon completion of the reaction, the mixture was cooled to 30° C. and then acidified with 50% sulphuric acid until the reaction mixture was acid to thymol blue.

500 parts of water were added and the mixture separated into two layers, namely an upper layer of an aqueous glycol solution containing sodium sulphate and a lower layer containing the chlorinated phenols. 1,636 parts of the lower layer were placed in a fractionation still having approximately 20 theoretical plates and was fractionated at a pressure of 15 mm. Hg. 247 parts of fronts containing water and ortho-dichlorobenzene were removed. The ortho-dichlorobenzene separated when the fronts fraction was allowed to stand and it could be recycled.

The second fraction of 77 parts consisted almost completely of ortho-dichlorobenzene and this could be recycled. The main fraction consisted of 1,163 parts of 2,4,5-trichlorophenol with a melting point of 65° C., a yield of 90% based on the tetrachlorobenzene used.

3,775 parts of the aqueous glycol solution which separated as the upper layer upon the addition of water to the acidified reaction mixture were placed in a simple dehydration apparatus and all the water was removed. The precipitated salt was separate by centrifuging and 2,550 parts of glycol were recovered. The glycol could be recycled.

We claim:
1. A process for the production of a polychlorophenol comprising subjecting a polychlorobenzene having at least three chlorine atoms in the molecule to hydrolysis with an alkali metal hydroxide in an aliphatic diol having up to four carbon atoms, at elevated temperature and in the presence of an amount, sufficient to hinder sublimation of the polychlorobenzene, of a chlorobenzene having fewer chlorine atoms in the molecule than the said polychlorobenzene.

2. A process as in claim 1 in which the polychlorophenol is a trichlorophenol, the polychlorobenzene is a tetrachlorobenzene, and the chlorobenzene is a dichlorobenzene.

3. A process as in claim 2 in which the trichlorophenol is 2,4,5-trichlorophenol, the tetrachlorobenzene is 1,2,4,5-tetrachlorobenzene, and the dichlorobenzene is ortho-dichlorobenzene.

4. A process as in claim 3 wherein the aliphatic diol is ethylene glycol.

5. A process as in claim 4 wherein the hydrolysis is effected at a temperature in the range of 160–185° C.

6. A process as in claim 3 in which the reaction mixture is cooled and is rendered at least neutral by the addition of an acid whose alkali metal salt corresponding to the alkali metal hydroxide employed is water-soluble but is substantially insoluble in the diol employed in the reaction.

7. A process as in claim 6 in which the mixture is, after the addition of the acid, diluted with sufficient water to give, upon standing, a two-layer system comprising an aqueous phase which contains the said salt and an organic phase containing the 2,4,5-trichlorophenol.

8. A process as in claim 7 in which the acid is sulfuric acid.

9. A process as in claim 3 in which from 0.1 to 0.4 mole of ortho-dichlorobenzene is used per mole of 1,2,4,5-tetrachlorobenzene.

10. A process for the production of a polychlorophenol comprising subjecting a polychlorobenzene having at least three chlorine atoms in the molecule to hydrolysis with an alkali metal hydroxide in an aliphatic diol selected from the group consisting of ethylene glycol and diethylene glycol, at elevated temperature and in the presence of an amount, sufficient to hinder sublimation of the polychlorobenzene, of a chlorobenzene having fewer chlorine atoms in the molecule than the said polychlorobenzene.

11. A process as in claim 1 in which the aliphatic diol is ethylene glycol.

12. A process for the production of 2,4,5-trichlorophenol comprising the hydrolysis at elevated temperature with sodium hydroxide of 1,2,4,5-tetrachlorobenzene in an aliphatic, high boiling, polyhydric alcohol, including the steps which comprise (a) employing as the said polyhydric alcohol an aliphatic diol which is miscible with water and which has up to four carbon atoms, (b) employing ortho-dichlorobenzene during the reaction to remove water evolved in the reaction, (c) cooling the reaction mixture and converting residual sodium hydroxide into a water-soluble salt insoluble in the water-miscible polyhydric alcohol, (d) diluting the resulting mixture with water to give an inorganic phase and an aqueous phase comprising the water-miscible polyhydric alcohol and the water-miscible salt, (e) separating the aqueous and organic phases, (f) subjecting the organic phase to distillation to separate 2,4,5-trichlorophenol, and (g) dehydrating the aqueous phase.

References Cited

UNITED STATES PATENTS 2,509,245  5/1950  Nikawitz et al. _____ 260—623

FOREIGN PATENTS 150,409  3/1953  Australia.

BERNARD HELFIN, *Primary Examiner.*

W. B. LONE, *Assistant Examiner.*

UNITED STATES PATENT OFFICE
CERTIFICATE OF CORRECTION

Patent No. 3,417,150 December 17, 1

Herbert F. Bondy et al.

It is certified that error appears in the above identified patent and that said Letters Patent are hereby corrected as shown below:

Column 1, line 42, "temperatures" should read -- temperature --. Colum line 34, "separate" should read -- separated --. Column 3, line 14, the cla reference numeral "1" should read -- 10 --. Column 4, line 6, "inorganic" should read -- organic --.

Signed and sealed this 17th day of March 1970.

(SEAL)
Attest:

Edward M. Fletcher, Jr.
Attesting Officer

WILLIAM E. SCHUYLER, JR.
Commissioner of Patents